US008725783B2

(12) United States Patent
Midorogi

(10) Patent No.: US 8,725,783 B2
(45) Date of Patent: May 13, 2014

(54) MATHEMATICAL EXPRESSION CALCULATION APPARATUS AND COMPUTER-READABLE MEDIUM

(75) Inventor: Satomi Midorogi, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 604 days.

(21) Appl. No.: 13/029,475

(22) Filed: Feb. 17, 2011

(65) Prior Publication Data

US 2011/0225219 A1 Sep. 15, 2011

(30) Foreign Application Priority Data

Mar. 15, 2010 (JP) ................................. 2010-056883

(51) Int. Cl.
*G06F 13/00* (2006.01)

(52) U.S. Cl.
USPC ........................................................ 708/168

(58) Field of Classification Search
USPC ................................................. 708/131–170
See application file for complete search history.

(56) References Cited

U.S. PATENT DOCUMENTS 8,504,600 B2 * 8/2013 Hatch ........................... 708/170

FOREIGN PATENT DOCUMENTS

JP 7-036836 A 2/1995
JP 2003-150563 A 5/2003

OTHER PUBLICATIONS

Japanese Office Action dated Nov. 15, 2011 (and English translation thereof) in counterpart Japanese Application No. 2010-056883.

* cited by examiner

*Primary Examiner* — Tan V. Mai
(74) *Attorney, Agent, or Firm* — Holtz, Holtz, Goodman & Chick, PC

(57) ABSTRACT

A mathematical expression calculation apparatus includes: a display; and a processor to perform the operations of: displaying a mathematical expression on the display; displaying terms included in the mathematical expression displayed on the display in display modes which differ among types of the terms respectively; specifying among the display modes a display mode of any of the terms of the mathematical expression displayed on the display, in accordance with operation of a user; and carrying out calculation among terms which are included in the terms of the mathematical expression displayed on the display and are displayed in the specified mode, and renewing and displaying the mathematical expression.

13 Claims, 9 Drawing Sheets

FIG. 6
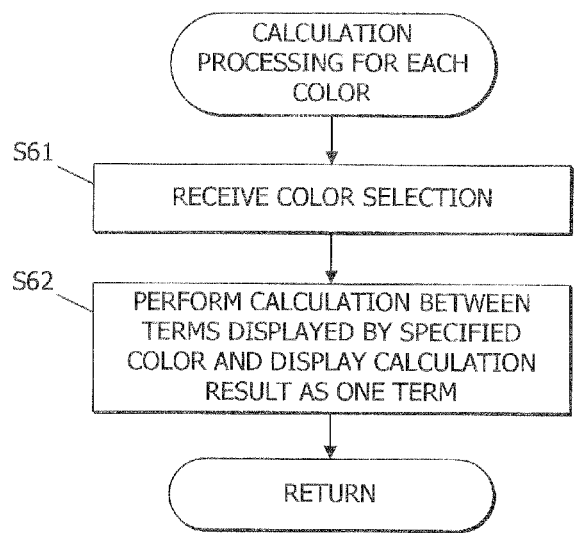
FIG. 7A
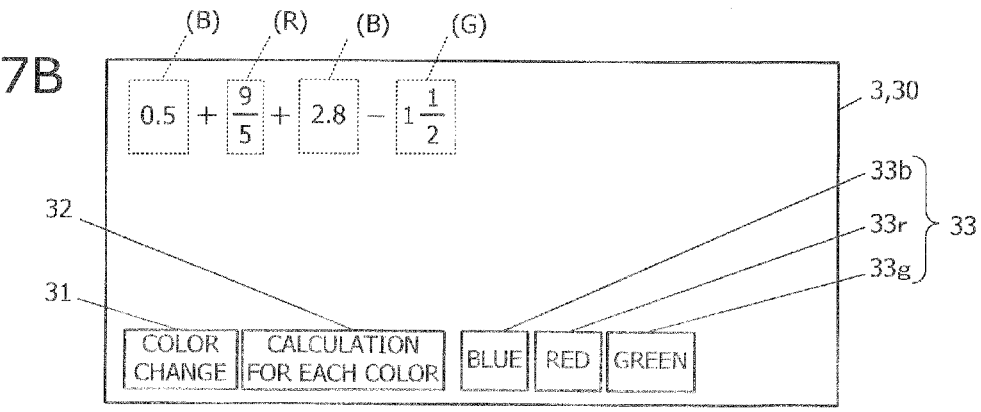
FIG. 7B

FIG. 10A
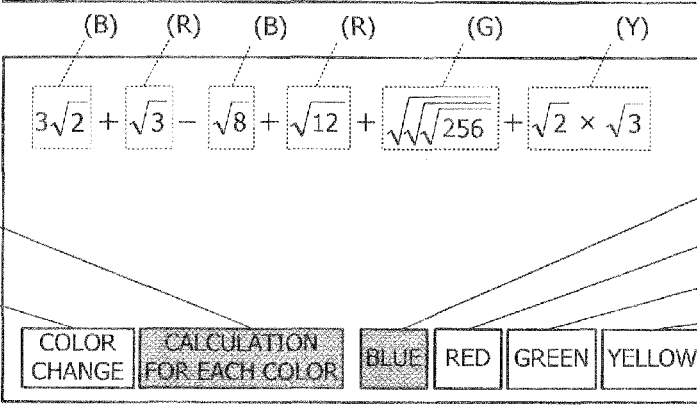
FIG. 10B
FIG. 10C
FIG. 10D
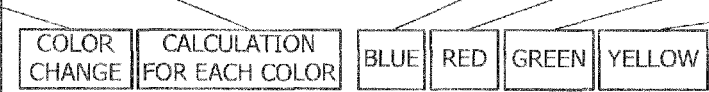

MATHEMATICAL EXPRESSION CALCULATION APPARATUS AND COMPUTER-READABLE MEDIUM

CROSS-REFERENCE TO RELATED APPLICATIONS

This application is based upon and claims the benefit of priority from the prior Japanese Patent Application No. 2010-056883 filed on 15 Mar. 2010, the entire contents of which are incorporated herein by reference.

BACKGROUND OF THE INVENTION

1. Field of the Invention

The present invention relates to a mathematical expression calculation apparatus and a computer-readable medium.

2. Description of Related Art

As a mathematical expression calculation apparatus which executes calculation of input various mathematical expressions and displays a result of the calculation, an electronic calculator which can display mid-flow mathematical expressions in sequence has been conventionally known. In such electronic calculator, since a calculation process is shown, there is a merit that even a beginner can easily understand the calculation process up to a final result.

However, if only the mid-flow mathematical expressions are merely displayed, a user would not think how the mathematical expression should be deformed, and high learning effect cannot be expected.

In the existing electronic calculators, since terms included in a mathematical expression are displayed in the same mode. Thus, in the case of a mathematical expression including many terms, there is a problem that the terms included in the mathematical expression cannot easily be distinguished from each other, and it is difficult to see the mathematical expression.

SUMMARY OF THE INVENTION

It is an object of the present invention to provide a mathematical expression calculation apparatus and a computer-readable medium capable of displaying a mathematical expression in an easily visible manner, and enhancing a learning effect.

According to a first aspect of the present invention, there is provided a mathematical expression calculation apparatus including:

a display; and a processor to perform the operations of:

displaying a mathematical expression on the display;

displaying terms included in the mathematical expression displayed on the display in display modes which differ among types of the terms respectively;

specifying among the display modes a display mode of any of the terms of the mathematical expression displayed on the display, in accordance with operation of a user; and carrying out calculation among terms which are included in the terms of the mathematical expression displayed on the display and are displayed in the specified mode, and renewing and displaying the mathematical expression.

According to a second aspect of the present invention, there is provided a computer-readable medium storing a program which is executed by a computer system including a display and which includes a series of commands to make the computer system execute the following processing of:

displaying a mathematical expression on the display;

displaying terms included in the mathematical expression displayed on the display in display modes which differ among types of the terms respectively;

specifying among the display modes a display mode of any of the terms of the mathematical expression displayed on the display, in accordance with operation of a user; and carrying out calculation among terms which are included in the terms of the mathematical expression displayed on the display and are displayed in the specified mode, and renewing and displaying the mathematical expression.

According to a third aspect of the present invention, there is provided a mathematical expression calculation apparatus including:

a mathematical expression display control section to display a mathematical expression;

a type-sorted display control section to display terms included in the mathematical expression displayed by the mathematical expression display control section in display modes which differ among types of the terms respectively;

a display mode specifying section to specify among the display modes a display mode of any of the terms of the mathematical expression in accordance with operation of a user; and a same type term calculation section to carry out calculation among terms which are included in the terms of the mathematical expression and are displayed in the specified mode, and which renews and displays the mathematical expression.

BRIEF DESCRIPTION OF THE DRAWINGS

The present invention will sufficiently be understood by the following detailed description and accompanying drawing, but they are provided for illustration only, and not for limiting the scope of the invention.

FIG. 6 is a flowchart showing a flow of color-sorted calculation processing;

FIGS. 7A and 7B are diagrams showing displayed contents of a display 3;

FIGS. 10A to 10D are diagrams showing displayed contents of the display 3.

DETAILED DESCRIPTION OF THE PREFERRED EMBODIMENTS

An example of an embodiment according to the present invention will be described in detail with reference to the accompanying drawings.

1.1 APPEARANCE CONFIGURATION

Figure 1:
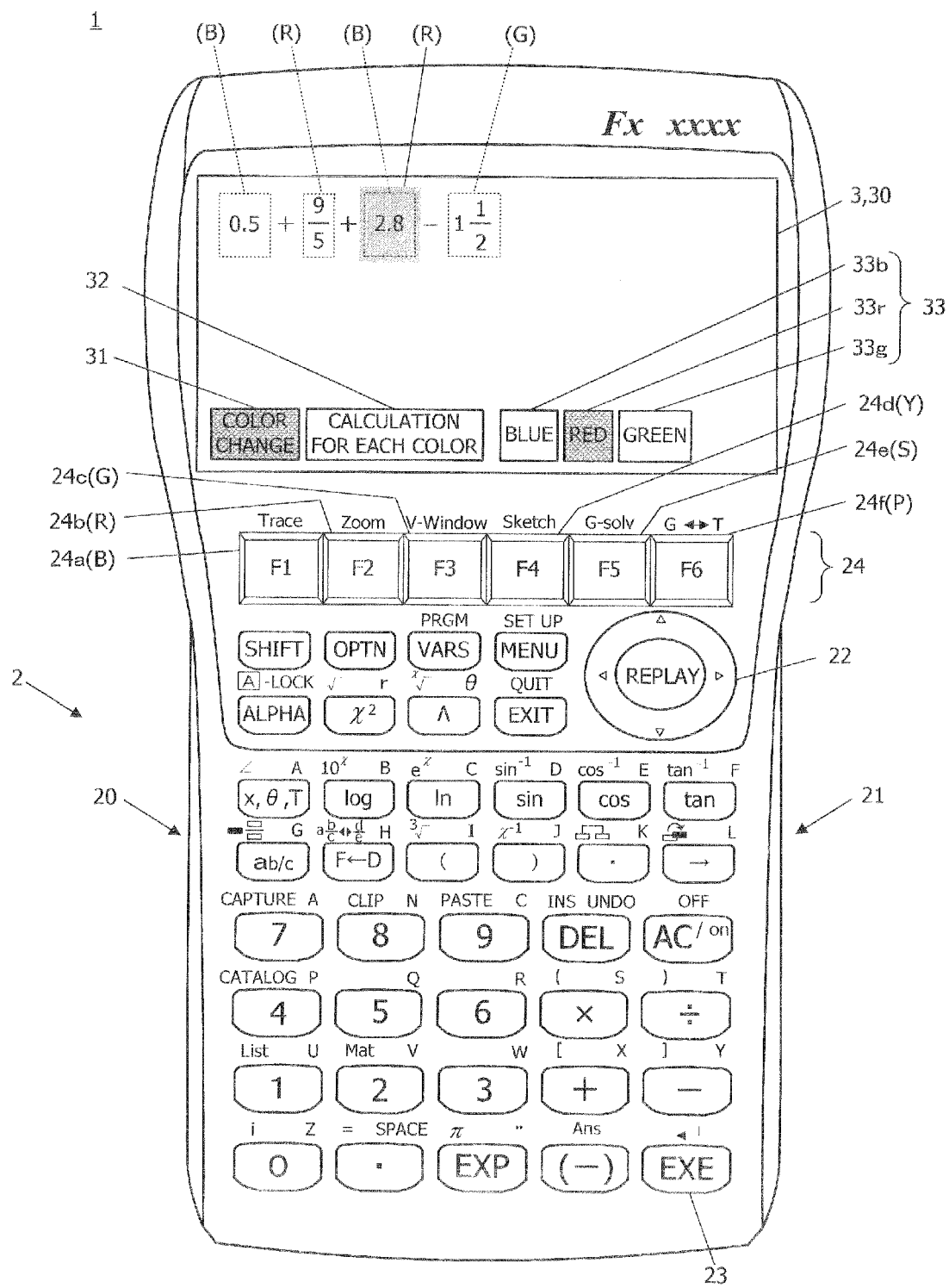
FIG. 1 is a plan diagram showing a schematic configuration of a scientific electronic calculator 1.

FIG. 1 is a plan diagram showing a schematic configuration of a scientific electronic calculator 1 to which a mathematical expression calculation apparatus of the present invention is applied.

As shown in FIG. 1, the scientific electronic calculator 1 includes a group of input keys 2 having various keys, and a display 3.

The group of input keys 2 receives an input operation of a configuration element of a mathematical expression such as numeric values and calculation symbols from a user, and receives instruction operations of various processing. The group of input keys 2 include a plurality of keys to which respective unique functions are allocated. In this embodiment, the group of input keys 2 includes numeric keys 20, calculation symbol keys 21, a cursor key 22, an EXE key 23 and function keys 24.

Among them, the numeric keys 20 receive an input operation of a numeric value. The calculation symbol keys 21 receive an input operation of various calculation symbols such as symbols of four arithmetic operations, parentheses, vinculum of fraction, radical signs ($\sqrt{\ }$), logarithm symbols, constants (circular constants ($\pi$), light speeds (c), and so on) and trigonometric function symbols.

The cursor key 22 is pressed when a cursor indicating a position to be edited or a position to be selected is moved in a predetermined direction in the display 3. In this embodiment, input can be carried out in four directions, i.e., upward, downward, leftward and rightward.

The EXE key 23 receives an input operation of an execution instruction of processing and a determination instruction. The EXE key 23 functions as a key for instructing the execution of calculation processing after a mathematical expression is input for example.

The function keys 24 have a plurality of keys for receiving an execution instruction of predetermined processing. In this embodiment, the function keys 24 have color keys 24a to 24f whose surface are uniquely colored (in blue, red, green, yellow, sky blue and pink, respectively). In FIG. 1, characters "B", "R", "G", "Y", "S" and "P" in parentheses added to symbols of the color keys 24a to 24f mean that colors of surface of the keys are blue, red, green, yellow, sky blue and pink.

The display 3 is composed of LCD (Liquid Crystal Display), ELD (Electronic Luminescent Display) or the like, and shows characters and symbols corresponding to operations of the group of input keys 2, mathematical expressions, results of calculations, and various data required for using the scientific electronic calculator 1. The display 3 of the embodiment is integrally provided with a touch panel 30 over its entire display screen surface. In FIG. 1, regions surrounded with broken lines in the display screen of the display 3 mean that numeric values, symbols and characteristics in the regions are displayed in corresponding colors ("B": blue, "R": red, "G": green, "Y": yellow) of symbols with respect to the regions. In FIG. 1, regions whose backgrounds are daubed mean that backgrounds of numeric values, symbols or characters in the regions are daubed with corresponding colors ("B": blue, "R": red) of symbols with respect to the regions.

The touch panel 30 detects a contact position of an input pen (not shown) with respect to the display screen of the display 3 in an electromagnetic induction manner, a magnetostriction manner or a pressure-sensitive manner, and outputs a signal of the contact position. Specifically, a color-changing soft key 31, a color-sorted calculation soft key 32 and various color soft keys 33 are displayed on the display 3 of the embodiment. If one of the soft keys is touched, the touch panel 30 outputs a signal corresponding touched soft key.

The color-changing soft key 31 is pressed when a user instructs to execute later-described color changing processing (see FIG. 5) in a later-described mathematical expression calculation processing (see FIG. 3). The color-sorted calculation soft key 32 is pressed when a user instructs to execute later-described color-sorted calculation processing (see FIG. 6) in later-described mathematical expression calculation processing. The various color soft keys 33 are pressed when a user specifies color in the later-described color changing processing or color-sorted calculation processing, and have a blue soft key 33b, a red soft key 33r and the like.

1.2 FUNCTION CONFIGURATION

Next, a function configuration of the scientific electronic calculator 1 will be described.

Figure 2:
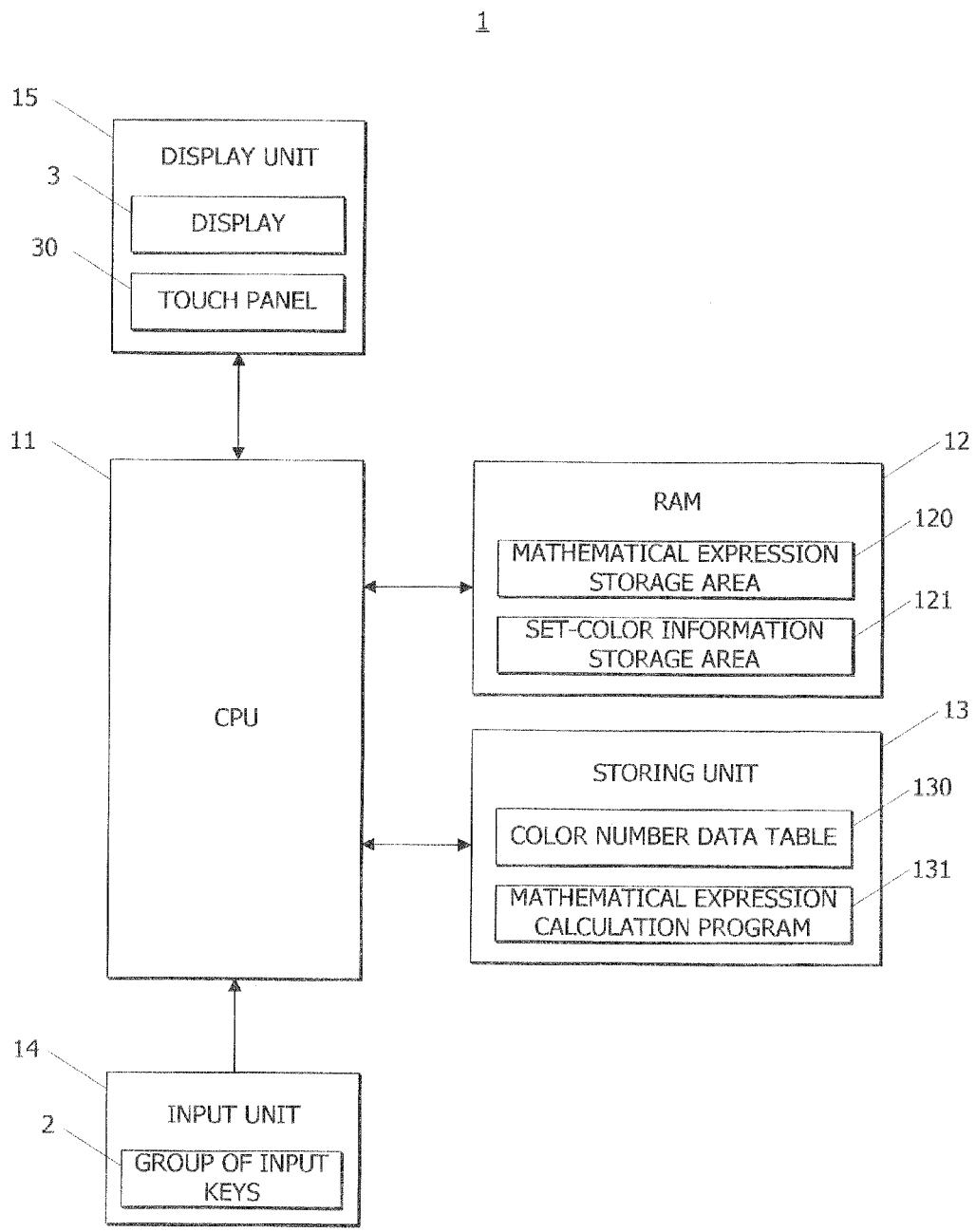
FIG. 2 is a block diagram showing a functional configuration of the scientific electronic calculator 1.

FIG. 2 is a block diagram showing the schematic function configuration of the scientific electronic calculator 1.

As shown in FIG. 2, the scientific electronic calculator 1 includes a key input unit 14, a display unit 15, a RAM (Random Access Memory) 12, a storing unit 13 and a CPU (Central Processing Unit) 11.

The key input unit 14 includes the above-described group of input keys 2, and outputs an operation signal corresponding to a pressed key to the CPU 11.

The display unit 15 includes the above-described display 3, and shows various pieces of information on the display 3 in accordance with a display signal from the CPU 11. The display unit 15 includes the touch panel 30 integrally provided on the display 3, and outputs, to the CPU 11, contact position information of the input pen with respect to the display screen.

The RAM 12 is a volatile memory in which information is temporarily stored, and includes a plurality of work areas in which various programs to be executed and data related to the various programs are stored. For example, the RAM 12 of this embodiment includes a mathematical expression storage area 120 and a set-color information storage area 121 as work areas.

A mathematical expression which is input in the later-described mathematical expression calculation processing (see FIG. 3) is stored in the mathematical expression storage area 120. When a type of a term included in a mathematical expression stored in the mathematical expression storage area 120 is converted in the later-described color changing processing (see FIG. 5) or when terms included in the mathematical expression are calculated in the later-described color-sorted calculation processing (see FIG. 6), the mathematical expression is renewed in accordance with such operation.

Information of color which is set in a type of a term in the later-described color-coded display processing (see FIG. 4) is stored in the set-color information storage area 121.

Here, the "term" in this embodiment is a group of numeric values, symbols or characters which are divided from each other by means of addition/subtraction symbols, and numeric values. Symbols or characters coupled with each other by means of multiplication/division symbols are included in the same term. Specifically, when a mathematical expression "$3\sqrt{2}+\sqrt{3}-\sqrt{8}+\sqrt{12}+\sqrt{\sqrt{\sqrt{256}}}+\sqrt{2}\times\sqrt{3}$" is input (see FIG. 10A), terms included in this mathematical expression are "$3\sqrt{2}$", "$\sqrt{3}$", "$\sqrt{8}$", "$\sqrt{12}$", "$\sqrt{\sqrt{\sqrt{256}}}$", and "$\sqrt{2}\times\sqrt{3}$"

In the embodiment, "type of term" means kinds of terms based on differences in expression forms such as integers, decimals (finite decimals and decimals which do not cycle such as acyclic decimals of infinite decimals), cyclic decimals, fractions (proper fractions and improper fractions), mixed numbers, roots and constants. Specifically, a term "0.5 (decimal)", a term "9/5 (fraction)" and a term "11/2 (mixed fraction)" are different from each other in type. Here, in a calculable term which is included in the mathematical expression and which is a term that can be calculated for simplifying its contents in the term, a type of the term as a result of calculation for simplifying the contents with respect to the calculable term is handled as a type of the calculable term. Specifically, since a term "2×0.2" is a calculable term, a type "decimal" of a term "0.4 (=2×0.2)" which is a result of calculation for simplifying the contents is a type of the term "2×0.2".

Further, "type of term" in a term including square root ($\sqrt{a}$) is a kind based on a difference of "a". Specifically, a term "$\sqrt{2}$($\sqrt{2}$ type)" and a term "$\sqrt{3}$($\sqrt{3}$ type)" are different from each other in type. Since a term "$\sqrt{8}$" is a calculable term, a type "$\sqrt{2}$ type" of a term "$2\sqrt{2}$(=$\sqrt{8}$)" which is a result of calculation for simplifying contents is a type of the term "$\sqrt{8}$", and the term "$\sqrt{8}$" and the term "$\sqrt{2}$" fall within the same type. Further, since a term "$\sqrt{2}\times\sqrt{3}$" is a calculable term, a type "$\sqrt{6}$ type" of a term "$\sqrt{6}$(=$\sqrt{2}\times\sqrt{3}$)" which is a result of calculation for simplifying contents is a type of the term "$\sqrt{2}\times\sqrt{3}$", and the term "$\sqrt{2}\times\sqrt{3}$" and the term "$\sqrt{6}$" fall within the same type. Thus, "type of term" including a square root is a kind of a term based on whether or not addition or subtraction of both terms is possible. In other words, in this embodiment, terms included in a mathematical expression are classified based on differences in expression forms, and terms of expression forms including a square root are classified based on whether or not addition or subtraction of both terms is possible.

The storing unit 13 is a nonvolatile memory such as a ROM (Read Only Memory), and various programs and various pieces of data are stored therein. Specifically, the storing unit 13 includes a color number data table 130 and a mathematical expression calculation program 131 as a program of the present invention.

Names of colors are associated with predetermined order and stored in the color number data table 130. Specifically, in this embodiment, "1 blue", "2 red", "3 green", "4 yellow" . . . are stored in the color number data table 130.

The mathematical expression calculation program 131 is a program for making the CPU 11 execute the later-described mathematical expression calculation processing (see FIG. 3).

The CPU 11 performs central control of various elements of the scientific electronic calculator 1. Specifically, the CPU 11 expands, in the RAM 12, a system program stored in the storing unit 13 and a program specified from various application programs, and executes various processing in cooperation with the program developed in the RAM 12.

1.3 OPERATION OF SCIENTIFIC ELECTRONIC CALCULATOR

Next, an operation of the scientific electronic calculator 1 will be described.

Figure 3:
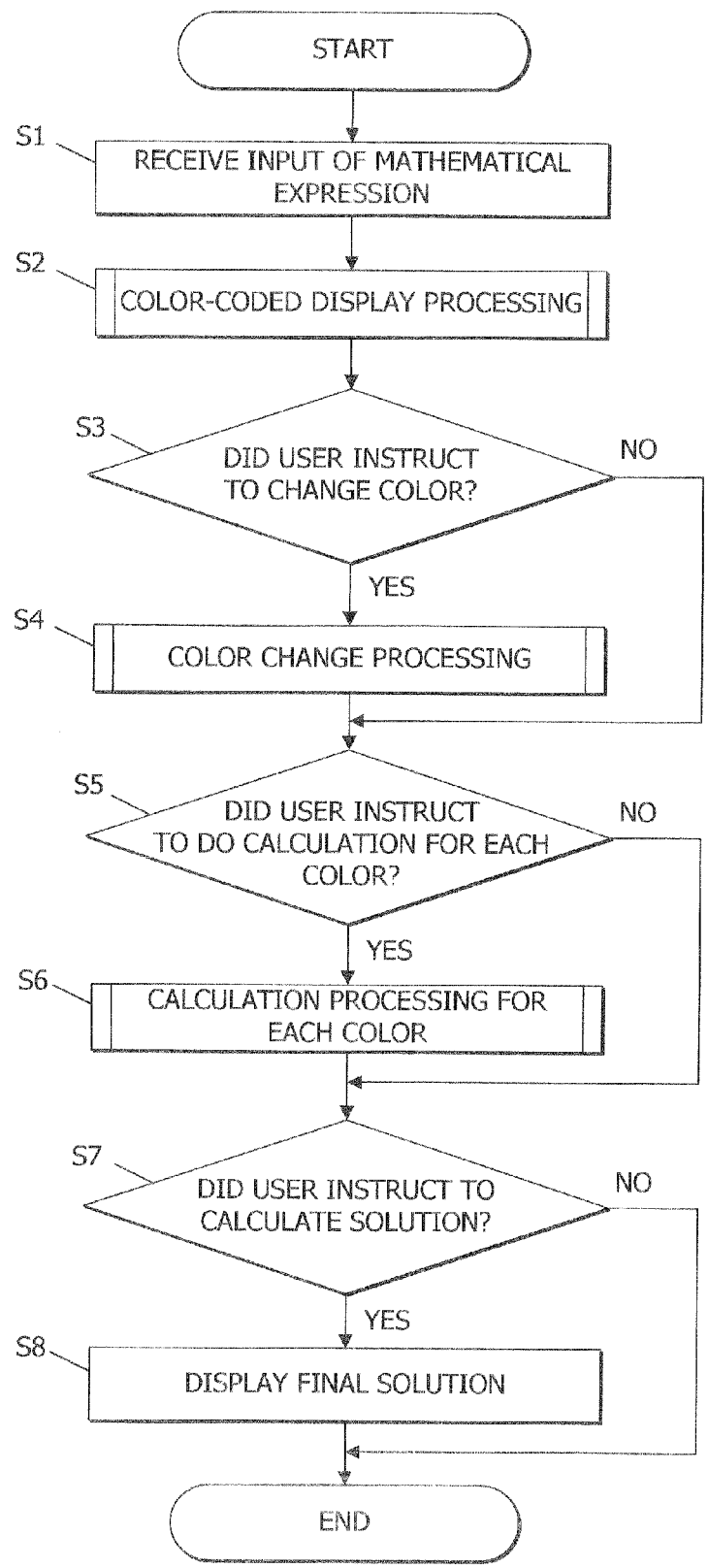
FIG. 3 is a flowchart showing a flow of calculation processing of a mathematical expression.

FIG. 3 is a flowchart for explaining an operation of the mathematical expression calculation processing. When a user inputs an execution instruction of the mathematical expression calculation processing in a state where a mode for calculating a color-sorted mathematical expression is selected through the touch panel 30 or the key input unit 14, the mathematical expression calculation program 131 is read from the storing unit 13 and appropriately expanded in the RAM 12 and as a result, the mathematical expression calculation processing is executed by cooperation between the mathematical expression calculation program 131 and the CPU 11.

As shown in FIG. 3, in the mathematical expression calculation processing, the CPU 11 first receives an input of a mathematical expression from a user through the key input unit 14 (step S1), the CPU 11 stores the mathematical expression in the mathematical expression storage area 120, and displays the same on the display 3. When the input contents are set by the user's operation of the EXE key 23 or the like, the color-coded display processing is carried out (step S2). In this embodiment, assume that the user inputs a polynomial in step S1.

Figure 4:
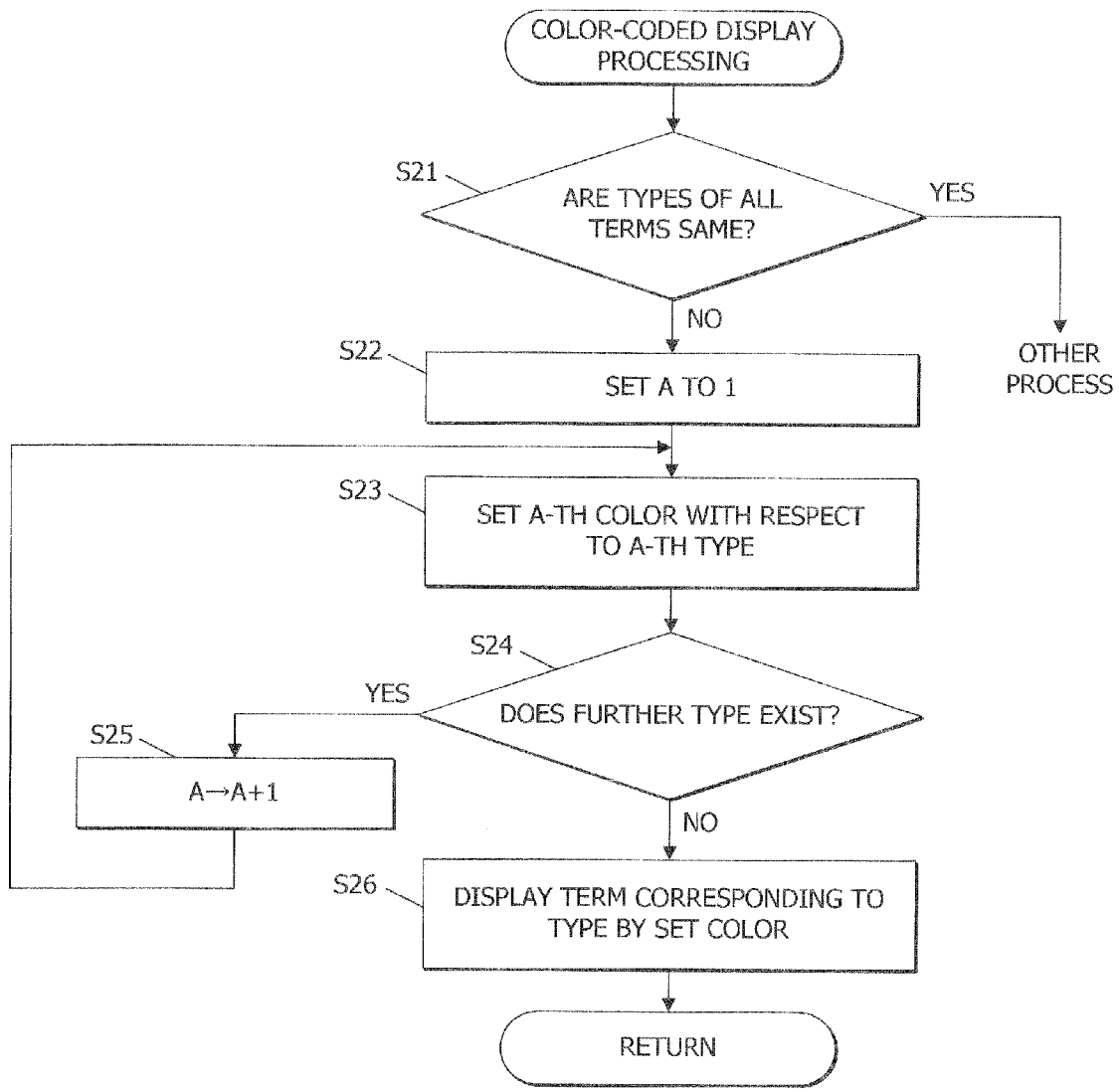
FIG. 4 is a flowchart showing a flow of color-coded display processing.

Specifically, as shown in FIG. 4, in the color-coded display processing, the CPU 11 first refers to the mathematical expression storage area 120, and determines whether or not types of all terms in a mathematical expression displayed on the display 3 are the same (step S21). At that time, when there is a term which can be calculated for simplifying contents in the term exists in the terms included in the mathematical expression displayed on the display 3, the CPU 11 detects the term as a calculable term, detects a type of the term when calculation for simplifying the contents is carried out for the calculable term, and handles the detected type as a type of that calculable term.

When it is determined that types of all of the terms are the same in step S21 (step S21; YES), the CPU 11 shifts this processing to another processing.

When it is determined that types of all of the terms are not the same in step S21 (step S21; NO), the CPU 11 sets a variable A to "1" (step S22).

Next, the CPU 11 refers to the mathematical expression storage area 120 to specify A-th type of all of types included in the mathematical expression displayed on the display 3, refers to the color number data table 130 to specify A-th color, associates the A-th type and the A-th color with each other, and stores them in the set-color information storage area 121 (step S23). Next, the CPU 11 refers to the mathematical expression storage area 120 and determines whether or not there is another type in the mathematical expression displayed on the display 3 (step S24), and when the CPU 11 determines that there is another type (step S24; YES), the CPU 11 sets a variable A to "A+1" and adds 1 to the variable A (step S25) and then, the procedure is shifted to step S23.

In this embodiment, assume that of types of terms included in the mathematical expression displayed on the display 3, the CPU 11 specifies types as a first type, a second type, a third type, a fourth type, . . . in this order from the top type (left type) in terms of display positions of corresponding terms. Thus, "blue" which is the first color, "red" which is the second color, "green" which the third color, "yellow" which is a fourth color, . . . are set for types in this order from the top display position of the corresponding term. Specifically, when a mathematical expression "$3\sqrt{2}+\sqrt{3}-\sqrt{8}+\sqrt{12}+\sqrt{\sqrt{\sqrt{256}}}+\sqrt{2}\times\sqrt{3}$" is input (see FIG. 10A), "blue" which is the first color is set for the first type "$\sqrt{2}$ type" (term "$3\sqrt{2}$" and term "$\sqrt{8}(=2\sqrt{2})$"), "red" which is the second color is set for the second type "$\sqrt{3}$ type" (term "$\sqrt{3}$" and term "$\sqrt{12}(=12(=2\sqrt{3}))$"), "green" which is the third color is set for the third type "integer" (term "$\sqrt{\sqrt{\sqrt{256}}}(=2)$"), and "yellow" which is the fourth color is set for the fourth type "$\sqrt{6}$ type" (term "$\sqrt{2}\times\sqrt{3}(=\sqrt{6})$").

When it is determined in step S24 that there is no other type (step S24; NO), the CPU 11 refers to the set-color information storage area 121 and displays terms corresponding types in corresponding colors on the display 3 (step S26), displays the color-changing soft key 31, the color-sorted calculation soft key 32 and various color soft keys 33 on the display 3 (see FIGS. 7B and 10B), renews the displayed contents on the display 3, and completes the color-coded display processing. According to this, the terms included in the mathematical expression displayed on the display 3 are displayed in colors (display mode) which differ from one type of a term to another. At that time, among terms included in the mathematical expression, when there is a term which can be calculated for simplifying contents in the term, that term is detected as a calculable term, a type of a term when calculation for simplifying the contents is carried out for the calculable term is detected, and the detected type is handled as a type of the calculable term. Thus, this calculable term is displayed in color (display mode) corresponding to the detected type.

In this embodiment, terms included in a mathematical expression are identifiably displayed by being displayed in different colors from one type of a term to another. However, the identification display manner is not limited as long as types of a term can be identified by display mode of a term. For example, types of a term may be identified and displayed by daubing in different colors, or may be identified and displayed by drawing underlines of different colors. The identification display manner is not limited to one using colors (chromatic colors), the manner is not limited only when types of a term can be identified by a display mode of a term, achromatic colors having different brightnesses (gradations) may be used, underlines or surrounding lines having different kinds of lines may be used, or different fonts may be used.

When the color-coded display processing is completed, as shown in FIG. 3, the CPU 11 determines whether or not a user instructed to change the color (step S3). In this embodiment, it is described that a user instructs to change the color by operating the color-changing soft key 31. However, it is also possible to instruct to change the color by operating the group of input keys 2 for example.

When it is determined that the user does not instruct to change the color (step S3; NO), the CPU 11 shifts the procedure to later-described step S5. When it is determined in step S3 that the user instructed to change the color (step S3; YES), the CPU 11 carries out the color changing processing (step S4).

Figure 5:
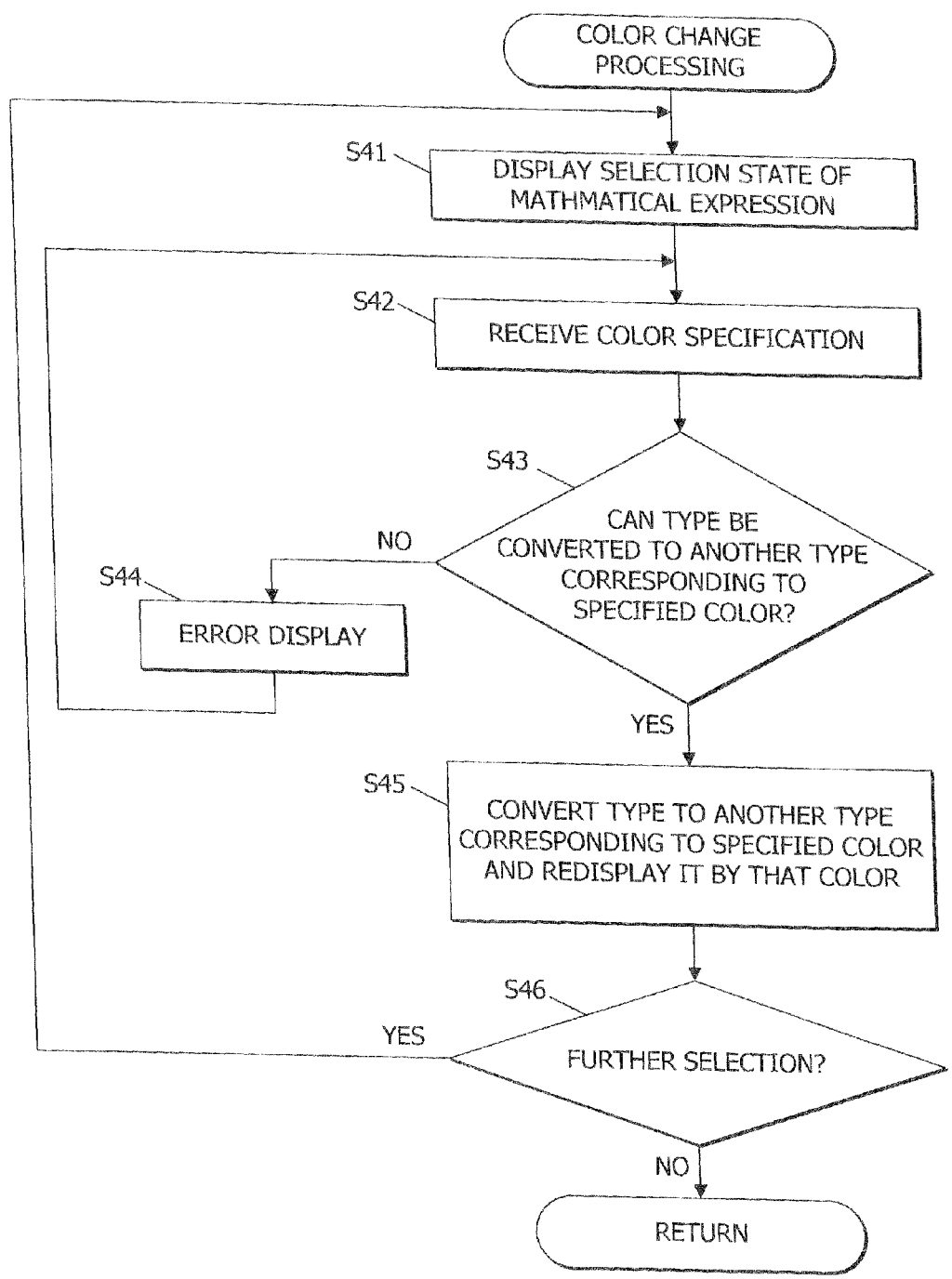
FIG. 5 is a flowchart showing a flow of color changing processing.

Specifically, as shown in FIG. 5, the CPU 11 requests a user to select a portion or all of mathematical expression displayed on the display 3 in the color changing processing, and displays the selection state on the display 3 (step S41). Here, in the embodiment, the user operates the group of input keys 2 such as the cursor key 22 or the touch panel 30 to select a portion or all of the mathematical expression. In this embodiment, it is described that the selection state is displayed by daubing the background of the selected portion which was selected by the user with a predetermined color such as gray. However, the displaying manner of the selection state is not limited to this, the selection state may be displayed by drawing an underline of predetermined color under a selected portion, or the selection state may be displayed by surrounding the selected portion by a line of predetermined color.

Next, the CPU 11 requests the user to specify color (display mode) of any of terms included in a mathematical expression displayed on the display 3 by means of the various color soft keys 33, and when the CPU 11 receives the specified result (step S42), the CPU 11 changes color of the background of the selected portion selected by the user to color specified by the user. Calculation for checking whether or not type can be converted to one corresponding to color specified by the user is carried out for each of terms (i.e., terms specified by the user) included in the selected portion selected by the user, and it is determined whether or not a term which can be converted to a type corresponding to color specified by the user exists in the terms included in the selected portion (step S43). In this embodiment, it is described that the user specifies color of any of terms included in the mathematical expression by operating any of the various color soft keys 33. However, it is possible to specify color by operating the group of input keys 2 such as the function keys 24.

In step S43, in the terms included in the selected portion selected by the user, when it is determined that there is no term which can be converted to the type corresponding to color specified by the user (step S43; NO), the CPU 11 displays an error indication on the display 3 (step S44), and the procedure is shifted to step S42 to request the user to again specify color.

When it is determined in step S43 that there is a term which can be converted to the type corresponding to color specified by the user in the terms included in the selected portion selected by the user (step S43; YES), the CPU 11 coverts the type of the term into the type corresponding to the color (display mode) specified by the user, and redisplays the term on the display 3 by the specified color (step S45), thereby renewing the displayed contents on the display 3, and renewing the mathematical expression stored in the mathematical expression storage area 120.

Next, the CPU 11 determines whether or not the user further selected a portion or all of the mathematical expression (step S46). When it is determined in step S46 that a portion or all of the mathematical expression was selected (step S46; YES), the CPU 11 shifts the procedure to step S41. When it is determined in step S46 that a portion or all of the mathematical expression was not selected (step S46; NO), the CPU 11 completes the color changing processing.

When the color changing processing is completed, the CPU 11 determines whether or not the user instructed to carry out color-sorted calculation (step S5). In this embodiment, it is described that the user instructs to carry out the color-sorted calculation by operating the color-sorted calculation soft key 32. However, it is also possible to instruct to carry out the color-sorted calculation by operating the group of input keys 2 for example.

When it is determined in step S5 that the user did not instruct to carry out the color-sorted calculation (step S5; NO), the CPU 11 shifts the procedure to later-described step S7. When it is determined in step S5 that the user instructed to carry out the color-sorted calculation (step S5; YES), the CPU 11 carries out the color-sorted calculation processing (step S6).

Specifically, as shown in FIG. 6, in the color-sorted calculation processing, the CPU 11 requests the user to specify color (display mode) of any of terms included in the mathematical expression displayed on the display 3 as specified color (specification mode) by means of the various color soft keys 33, and when the CPU 11 receives the specification (step S61), the CPU 11 refers to the mathematical expression storage area 120, performs calculation among terms which are included in the mathematical expression displayed on the display 3 and displayed in the specified color (specification mode) specified by the user, and displays them as one term on the display 3 (step S62). Accordingly, the displayed contents on the display 3 are renewed, the mathematical expression stored in the mathematical expression storage area 120 is renewed, and the color-sorted calculation processing is completed. In this embodiment, it is described that the user specifies the specified color by operating any of the various color soft keys 33. However, the user can specify the specified color by operating the group of input keys 2 such as the function keys 24 for example.

When the above-described color-sorted calculation processing is completed, the CPU 11 determines whether or not the user instructed to calculate a solution (step S7) as shown in FIG. 3. In this embodiment, it is described that the user instructs to calculate a solution by operating the EXE key 23. However, it is possible to instruct to calculate a solution by operating the other group of input keys 2 or the touch panel 30.

When it is determined in step S7 that the user did not instruct to calculate the solution (step S7; NO), the CPU 11 completes the mathematical expression calculation processing.

When it is determined in step S7 that the user instructed to calculate the solution (step S7; YES), the CPU 11 calculates a final solution (final result) of a mathematical expression displayed on the display 3, displays the same on the display 3 (step S8), thereby renewing the displayed contents on the display 3, renewing the mathematical expression stored in the mathematical expression storage area 120, and completes the mathematical expression calculation processing.

1.4 OPERATION EXAMPLES

An operation of the scientific electronic calculator 1 will be described concretely with reference to the drawings.

Operation Example 1

First, as shown in FIG. 7A, when a user operates the group of input keys 2 and an input of a mathematical expression "0.5+9/5+2.8−11/2" is received through the key input unit 14 (step S1), the input mathematical expression is stored in the mathematical expression storage area 120, and is displayed on the display 3. When the user operates the EXE key 23 and the like, the color-coded display processing is carried out (step S2).

In the color-coded display processing, since types of terms included in the mathematical expression displayed on the display 3 are "decimal (term "0.5" and term "2.8")", "fraction (term "9/5")" and "mixed fraction (term "11/2")", it is determined that the types of all of terms included in the mathematical expression displayed on the display 3 are not the same (step S21; NO).

Next, the variable A is set to "1" (step S22). Then, "blue" which is the first color is set for the first type "decimal" (step S23), and this information is stored in the set-color information storage area 121.

Next, it is determined that there is another type (step S24; YES), the variable A is set to "2" (step S25). Then, "red" which is the second color is set for the second type "fraction" (step S23), and this information is stored in the set-color information storage area 121.

Next, it is determined that there is another type (step S24; YES), the variable A is set to "3" (step S25). Then, "green" which is the third color is set for the third type "mixed fraction" (step S23), and this information is stored in the set-color information storage area 121.

Next, it is determined that there is no further type (step S24; NO), a term "0.5" and a term "2.8" which are of "decimal" type are displayed in "blue", a term "9/5" which is of "fraction" type is displayed in "red", a term "11/2" which is of "mixed fraction" type is displayed in "green" so that the terms corresponding to the types are displayed on the display 3 in set colors as shown in FIG. 7B (step S26), and the displayed contents on the display 3 are renewed. At that time, the color-changing soft key 31, the color-sorted calculation soft key 32 and the various color soft keys 33 are also displayed on the display 3. Here, the blue soft key 33b, the red soft key 33r and the green soft key 33g which are keys corresponding to colors set for the types are displayed as the various color soft keys 33.

Next, when the user operates the color-changing soft key 31, it is determined that the user instructed to change color (step S3; YES), and the color changing processing is carried out (step S4).

A case where a selected portion selected by the user as a portion where color is changed, i.e. as a portion where type of term is converted is a portion of a mathematical expression, and a case where the selected portion is all of the mathematical expression will be separated described below.

First, the case where the selected portion selected by the user is a term "2.8", i.e. a portion of the mathematical expression will be described with reference to FIGS. 8A to 8C.

In the color changing processing, a background of the term "2.8" of the mathematical expression displayed on the display 3 is daubed with predetermined color such as gray, thereby displaying the selection state of the mathematical expression (step S41).

Figure 8A:
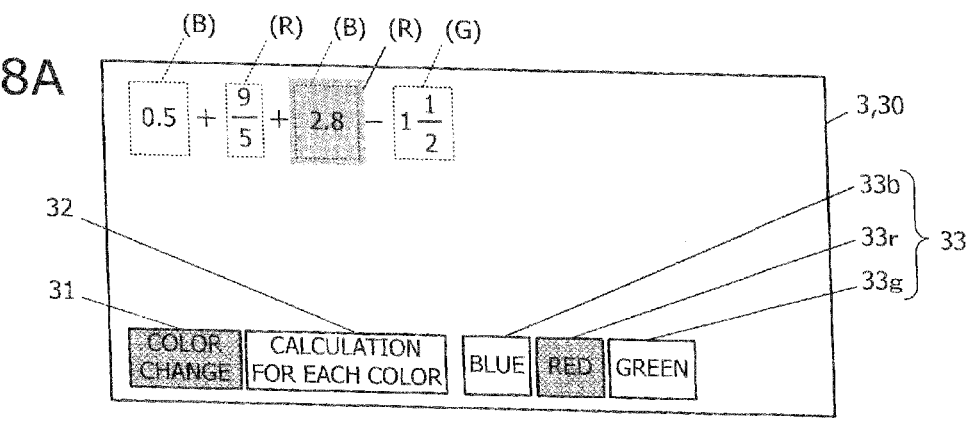
FIGS. 8A to 8C are diagrams showing displayed contents of the display 3.

Next, when the user operates the red soft key 33r and the specification of color by the user is received through the touch panel 30 (step S42), color daubing the background of the term "2.8" is changed to "red" specified by the user as shown in FIG. 8A, and it is determined that the term "2.8" included in the selected portion selected by the user is a term which can be converted into type "fraction" corresponding to the color specified by the user (step S43; YES).

Figure 8B:
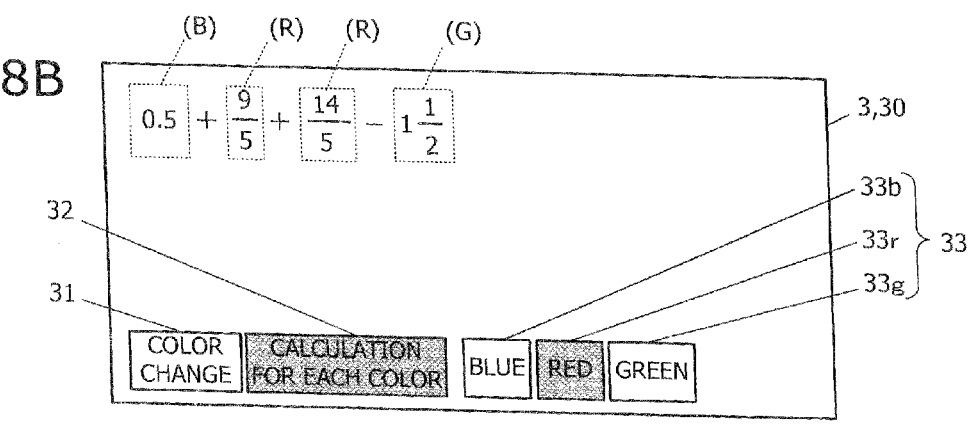
Figure 8C:
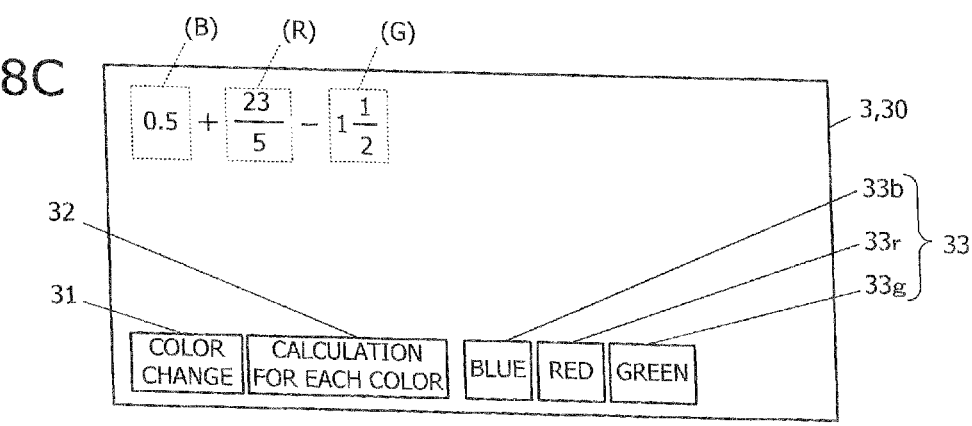

Next, as shown in FIG. 8B, the term "2.8" is converted into a term "14/5", and this is again displayed on the display 3 in "red" which is the color specified by the user (step S45), thereby renewing the displayed contents on the display 3, and the term "14/5" is written over the term "2.8", thereby renewing the mathematical expression stored in the mathematical expression storage area 120.

Next, when the user operates the color-sorted calculation soft key 32, it is determined that the user did not further select a portion or all of the mathematical expression (step S46; NO), it is determined that the user instructed to carry out the color-sorted calculation (step S5; YES), and the color-sorted calculation processing is carried out (step S6).

In the color-sorted calculation processing, when the user operates the red soft key 33r and the specification of color specified by the user is received through the touch panel 30 (step S61), among the terms included in the mathematical expression displayed on the display 3, calculation is carried out between a term "9/5" and a term "14/5" displayed in the specified "red" specified by the user. As shown in FIG. 8C, this is displayed on the display 3 as one term "23/5" (step S62) so that the displayed contents on the display 3 are renewed, and the "23/5" is written over a mathematical expression "9/5+14/5" so that the mathematical expression stored in the mathematical expression storage area 120 is renewed.

Then, when the user operates the EXE key 23, it is determined that the user instructed to calculate a solution (step S7; YES), a final solution (final result) of the mathematical expression displayed on the display 3 is calculated and the calculation result is displayed on the display 3 (step S8) so that the displayed contents on the display 3 are renewed and the mathematical expression stored in the mathematical expression storage area 120 is renewed.

Next, a case where the selected portion selected by the user is a mathematical expression "0.5+9/5+2.8−11/2", i.e. all of the mathematical expression will be described with reference to FIGS. 9A to 9C.

In the color changing processing, a background of all of the mathematical expression displayed on the display 3 is daubed with predetermined color such as gray, thereby displaying the selection state of the mathematical expression (step S41).

Figure 9A:
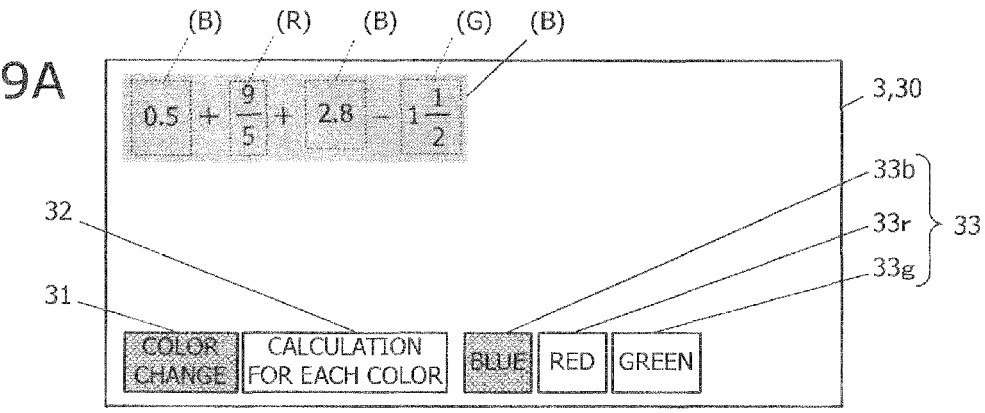
FIGS. 9A to 9C are diagrams showing displayed contents of the display 3.

Next, when the user operates the blue soft key 33b and the specification of color by the user is received through the touch panel 30 (step S42), color daubing the background of all of the mathematical expression is changed to "blue" specified by the user as shown in FIG. 9A, and it is determined that the terms "9/5" and "11/2" included in the selected portion selected by the user are terms which can be converted into a type "decimal" corresponding to the color specified by the user (step S43; YES).

Figure 9B:
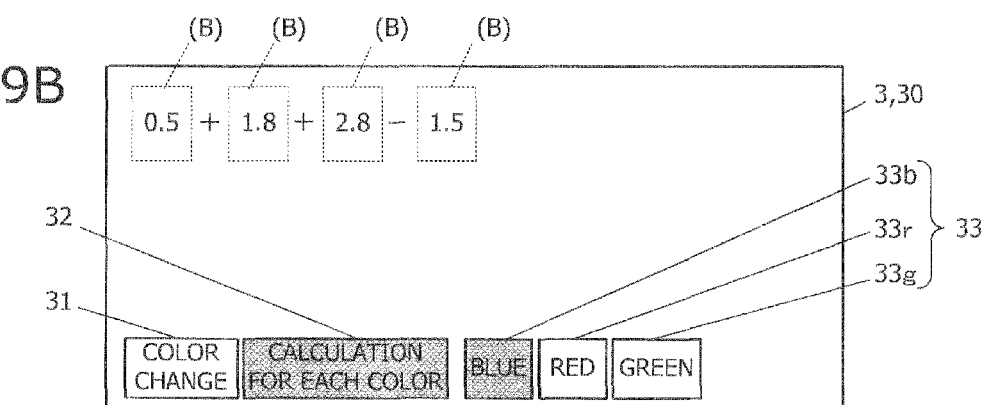
Figure 9C:
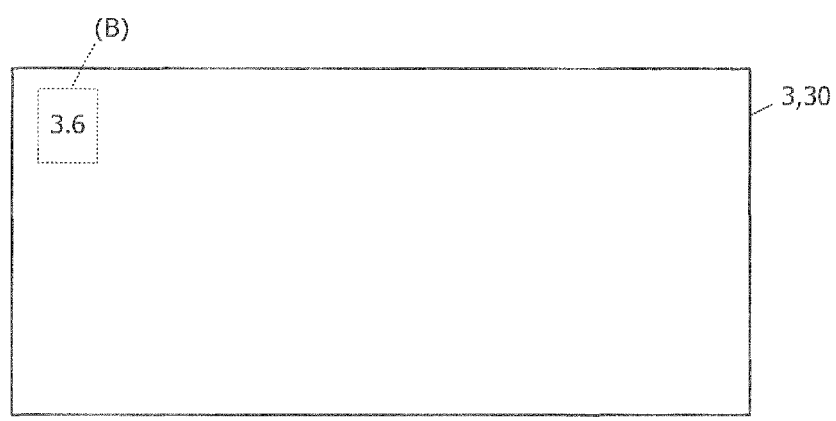

Next, as shown in FIG. 9B, the term "9/5" is converted into a term "1.8", the term "11/2" is converted into a term "1.5" and the conversion results are again displayed in "blue" specified by the user (step S45) so that the displayed contents on the display 3 are renewed, the term "1.8" is written over the term "9/5" and the term "1.5" is written over the term "11/2" so that the mathematical expression stored in the mathematical expression storage area 120 is renewed.

Next, when the user operates the color-sorted calculation soft key 32, it is determined that the user did not further select a portion or all of the mathematical expression (step S46; NO), it is determined that the user instructed to carry out the color-sorted calculation (step S5; YES), and the color-sorted calculation processing is carried out (step S6).

In the color-sorted calculation processing, when the user operates the blue soft key 33b and the specification of color by the user is received through the touch panel 30 (step S61), calculation is carried out among a term "0.5", a term "1.8" a term "2.8", and a term "1.5" which are included in the mathematical expression displayed on the display 3 and are displayed in the specified "blue" specified by the user. As shown in FIG. 9C, this is displayed on the display 3 as one term "3.6" (step S62) so that the displayed contents on the display 3 are renewed, and the "3.6" is written over a mathematical expression "0.5+1.8+2.8−1.5" so that the mathematical expression stored in the mathematical expression storage area 120 is renewed.

Alternatively, when the user operates the EXE key 23 without operating the color-sorted calculation soft key 32, it is determined that the user did not instruct to carry out the color-sorted calculation (step S5; NO), and it is determined that the user instructed to calculate a solution (step S7; YES). A final solution (final result) of the mathematical expression displayed on the display 3 is calculated, a term "3.6" which is the final result is displayed on the display 3 (step S8), thereby renewing the displayed contents on the display 3, the term "3.6" is written over the mathematical expression "0.5+1.8+2.8−1.5", thereby renewing the mathematical expression stored in the mathematical expression storage area 120.

Operation Example 2

First, as shown in FIG. 10A, when the user operates the group of input keys 2 and the input of a mathematical expression "$3\sqrt{2}+\sqrt{3}-\sqrt{8}+\sqrt{12}+\sqrt{\sqrt{\sqrt{256}}}+\sqrt{2}\times\sqrt{3}$" is received through the key input unit 14 (step S1), the input mathematical expression is stored in the mathematical expression storage area 120 and is also displayed on the display 3. When the user operates the EXE key 23, the color-coded display processing is carried out (step S2).

In the color-coded display processing, since terms included in the mathematical expression displayed on the display 3 are "$\sqrt{2}$ type (term "$3\sqrt{2}$" and term "$\sqrt{8}$")", "$\sqrt{3}$ type (term "$\sqrt{3}$" and term "$\sqrt{12}$")", "integer (term "$\sqrt{\sqrt{\sqrt{256}}}$")" and "$\sqrt{6}$ type (term "$\sqrt{2}\times\sqrt{3}$")", it is determined that the types of all of the terms included in the mathematical expression displayed on the display 3 are not the same (step S21; NO).

Next, the variable A is set to "1" (step S22). Then, "blue" which is the first color is set for the first type "$\sqrt{2}$ type" (step S23), and this information is stored in the set-color information storage area 121.

Next, it is determined that there is another type (step S24; YES), the variable A is set to "2" (step S25). Then, "red" which is the second color is set for the second type "$\sqrt{3}$ type" (step S23), and this information is stored in the set-color information storage area 121.

Next, it is determined that there is another type (step S24; YES), the variable A is set to "3" (step S25). Then, "green" which is the third color is set for the third type "integer" (step S23), and this information is stored in the set-color information storage area 121.

Next, it is determined that there is another type (step S24; YES), the variable A is set to "4" (step S25). Then, "yellow" which is the fourth color is set for the fourth type "$\sqrt{6}$ type" (step S23), and this information is stored in the set-color information storage area 121.

Next, it is determined that there is no further type (step S24; NO), as shown in FIG. 10B, a term "$3\sqrt{2}$" and a term "$\sqrt{8}$" whose types are "$\sqrt{2}$ type" are displayed in "blue", a term "$\sqrt{3}$" and a term "$\sqrt{12}$" whose types are "$\sqrt{3}$ type" are displayed in "red", a term "$\sqrt{\sqrt{\sqrt{256}}}$" whose type is "integer" is displayed in "green", a term "$\sqrt{2}\times\sqrt{3}$" whose type is "$\sqrt{6}$ type" is displayed in "yellow" so that the terms corresponding to the types are displayed on the display 3 in the set colors (step S26), and the displayed contents on the display 3 are renewed. At that time, the color-changing soft key 31, the color-sorted calculation soft key 32 and the various color soft keys 33 are displayed on the display 3. Here, the blue soft keys 33b, the red soft keys 33r, the green soft keys 33g and the yellow soft keys 33y which are keys corresponding to colors set to the types are displayed as the various color soft keys 33.

Next, when the user operates the color-sorted calculation soft key 32 without operating the color-changing soft key 31, it is determined that the user did not specify the color change (step S3; NO), it is determined that the user specified the color-sorted calculation (step S5; YES), and the color-sorted calculation processing is carried out (step S6).

In the color-sorted calculation processing, when the user operates the blue soft keys 33b and the specification of specified color from the user is received through the touch panel 30 (step S61), calculation is carried out between a term "$3\sqrt{2}$" and a term "$\sqrt{8}$" which are included in the mathematical expression displayed on the display 3 and are displayed in "blue" specified by the user, and this is displayed on the display 3 as one term "$\sqrt{2}$" as shown in FIG. 10C (step S62), thereby the displayed contents on the display 3 are renewed, and a term "$\sqrt{2}$" is written over a mathematical expression "$3\sqrt{2}-\sqrt{8}$" so that the mathematical expression stored in the mathematical expression storage area 120 is renewed.

Next, when the user operates the EXE key 23, it is determined that the user instructed to calculate a solution (step S7; YES), a final solution (final result) of the mathematical expression displayed on the display 3 is calculated. As shown in FIG. 10D, a mathematical expression "$\sqrt{2}+3\sqrt{3}+2+\sqrt{6}$" which is the final result is displayed on the display 3 (step S8), thereby renewing the displayed contents on the display 3, and a mathematical expression "$\sqrt{2}+3\sqrt{3}+2+\sqrt{6}$" is written over the mathematical expression "$\sqrt{2}+\sqrt{3}+\sqrt{12}+\sqrt{\sqrt{\sqrt{256}}}+\sqrt{2}\times\sqrt{3}$", thereby renewing the mathematical expression stored in the mathematical expression storage area 120.

According to the embodiment, as shown in steps S1 to S2 of FIG. 3 and in FIG. 4, a mathematical expression which is input by the user is displayed on the display 3, and terms included in the mathematical expression displayed on the display 3 are displayed in colors (display mode) which differ from one type to another of the term. Thus, the mathematical expression is displayed in an easily viewable manner.

As shown in steps S5 to S6 of FIG. 3 and in FIG. 6, color (display mode) of any of terms included in a mathematical expression displayed on the display 3 is specified as a specified color (specification mode) in accordance with a user's operation, a calculation is carried out between terms which are included in the mathematical expression displayed on the display 3 and are displayed in the specified color, and the displayed contents on the display 3 are renewed. Thus, it is possible to make the user think and learn the calculation process, and the learning effect can be enhanced.

As shown in step S21 of FIG. 4, among terms included in a mathematical expression displayed on the display 3, a term which can be calculated for simplifying contents in the term is detected as a calculable term, a type of the term when the calculation for simplifying the contents is carried out for that calculable term is detected, and the calculable term is displayed on the display 3 in color (display mode) corresponding to the detected type. Thus, the display mode of the term is not excessively complicated, and the mathematical expression is displayed in an easily viewable manner.

As shown in steps S3 to S4 of FIG. 3 and in FIG. 5, a term included in the mathematical expression displayed on the display 3, and color (display mode) of any of terms included in the mathematical expression are specified in accordance with the user's operation. A type of the specified term is converted into a type corresponding to the specified color (display mode), and the displayed contents on the display 3 are renewed. Thus, it is possible to make the user learn the conversion of types of terms while thinking, and the learning effect can be enhanced.

Detailed structures and detailed operations of the scientific electronic calculator 1 in the embodiment can also appropriately be modified within a range not departing from the subject matter of the invention of course.

Although the mathematical expression calculation apparatus of the present invention is described as the scientific electronic calculator 1, articles to which the invention can be applied are not limited to this product, and the invention can also be applied to general electronic devices such as cellular phones, personal computers, PDAs (personal Digital Assistants) and game machines. The mathematical expression calculation program 131 of the invention may be stored in a memory card or a CD which can be attached to and detached from the mathematical expression calculation apparatus.

The color-sorted calculation processing (see FIG. 6) is described assuming that a plurality of terms displayed in specified color specified by a user are included in a mathematical expression displayed on the display 3. However, the color-sorted calculation processing is not limited to this. Specifically, it is possible to employ the following configuration: When the CPU 11 receives specification of specified color from a user (step S61), the CPU 11 refers to the mathematical expression storage area 120, and determines whether or not a plurality of terms displayed in the specified color specified by the user are included in the mathematical expression displayed on the display 3, and when it is determined that that the plurality of terms are included, calculation is carried out among these plurality of terms to display this as one term on the display 3 (step S62), and when it is determined that the plurality of terms are not included, an error indication is displayed on the display 3 and the CPU 11 again requests the user to specify color.

Further, "type of term" is described as a kind of a term based on a difference in display style, and a term including a portion display form (square root in the embodiment) is described as a kind of a term based on whether or not addition/subtraction is possible. However, the "type of term" is not limited to this, and the "type of term" may be at least one of kind of term based on the difference in display form, and a kind of a term based on whether or not addition/subtraction is possible.

What is claimed is:

1. A mathematical expression calculation apparatus comprising:
   a display; and
   a processor which performs operations of:
      displaying a mathematical expression which includes a plurality of terms on the display;
      displaying the plurality of terms included in the mathematical expression on the display in a plurality of kinds of display modes which respectively differ among a plurality of types of the plurality of terms;
      specifying one kind of display mode from among the plurality of kinds of display modes, in accordance with an operation of a user; and
      carrying out calculation among terms which are included in the plurality of terms of the mathematical expression and which are displayed in the display mode of the specified kind, in response to specifying said one kind of display mode, and renewing and displaying the mathematical expression.

2. The mathematical expression calculation apparatus according to claim 1, wherein the processor further performs operations of:
   simplifying a term which is included in the plurality of terms of the mathematical expression displayed on the display;
   detecting a type of the simplified term from among the plurality of types based on a result of the simplification; and
   displaying the simplified term in a display mode whose kind corresponds to the detected type.

3. The mathematical expression calculation apparatus according to claim 2, wherein the processor further performs operations of:
   receiving a user input that specifies any of the plurality of terms of the mathematical expression displayed on the display;
   receiving a user input that changes a kind of display mode of the specified one of the plurality of terms to another one of the plurality of kinds of display modes; and
   converting a type of the specified one of the plurality of terms into another type corresponding to said another one of the plurality of kinds of display modes, and renewing and displaying the mathematical expression.

4. The mathematical expression calculation apparatus according to claim 1, wherein the processor further performs operations of:
   receiving a user input that specifies any of the plurality of terms of the mathematical expression displayed on the display;
   receiving a user input that changes a kind of display mode of the specified one of the plurality of terms to another one of the plurality of kinds of display modes; and
   converting a type of the specified one of the plurality of terms into another type corresponding to said another one of the plurality of kinds of display modes, and renewing and displaying the mathematical expression.

5. A non-transitory computer-readable storage medium having a program stored thereon which is executable by a computer system including a display, the program causing the computer system to perform functions comprising:
   displaying a mathematical expression which includes a plurality of terms on the display;

displaying the plurality of terms included in the mathematical expression on the display in a plurality of kinds of display modes which respectively differ among a plurality of types of the plurality of terms;

specifying one kind of display mode from among the plurality of kinds of display modes, in accordance with an operation of a user; and carrying out calculation among terms which are included in the plurality of terms of the mathematical expression and which are displayed in the display mode of the specified kind, in response to specifying said one kind of display mode, and renewing and displaying the mathematical expression.

6. The non-transitory computer-readable storage medium according to claim 5, wherein the program further causes the computer system to perform functions comprising:

simplifying a term which is included in the plurality of terms of the mathematical expression displayed on the display;

detecting a type of the simplified term from among the plurality of types based on a result of the simplification; and displaying the simplified term in a display mode whose kind corresponds to the detected type.

7. The non-transitory computer-readable storage medium according to claim 6, wherein the program further causes the computer system to perform functions comprising:

receiving a user input that specifies any of the plurality of terms of the mathematical expression displayed on the display;

receiving a user input that changes a kind of display mode of the specified one of the plurality of terms to another one of the plurality of kinds of display modes; and converting a type of the specified one of the plurality of terms into another type corresponding to said another one of the plurality of kinds of display modes, and renewing and displaying the mathematical expression.

8. The non-transitory computer-readable storage medium according to claim 5, wherein the program further causes the computer system to perform functions comprising:

receiving a user input that specifies any of the plurality of terms of the mathematical expression displayed on the display;

receiving a user input that changes a kind of display mode of the specified one of the plurality of terms to another one of the plurality of kinds of display modes; and converting a type of the specified one of the plurality of terms into another type corresponding to said another one of the plurality of kinds of display modes, and renewing and displaying the mathematical expression.

9. A mathematical expression calculation apparatus comprising:

a mathematical expression display control section to display a mathematical expression which includes a plurality of terms on a display;

a type-sorted display control section to display the plurality of terms included in the mathematical expression in a plurality of kinds of display modes which respectively differ among a plurality of types of the plurality of terms;

a display mode specifying section to specify one kind of display mode from among the plurality of kinds of display modes, in accordance with an operation of a user; and a same type term calculation section to carry out calculation among terms which are included in the plurality of terms of the mathematical expression and which are displayed in the display mode of the specified kind, in a higher priority order than calculation of other terms of the mathematical expression, in response to specifying said one kind of display mode, and to renew and display the mathematical expression.

10. The mathematical expression calculation apparatus according to claim 9, wherein the type-sorted display control section includes a type detecting section which simplifies a term included in the plurality of terms of the displayed mathematical expression and which detects a type of the simplified term from among the plurality of types based on a result of the simplification, and wherein the simplified term is displayed in a display mode whose kind corresponds to the type detected by the type detecting section.

11. The mathematical expression calculation apparatus according to claim 10, further comprising:

a term mode specifying section to receive a user input that specifies any of the plurality of terms of the displayed mathematical expression;

a kind changing section to receive a user input that changes a kind of display mode of the specified one of the plurality of terms to another one of the plurality of kinds of display modes; and a type converting section to convert a type of the specified one of the plurality of terms into another type corresponding to said another one of the plurality of kinds of display modes, and to renew and display the mathematical expression.

12. The mathematical expression calculation apparatus according to claim 9, further comprising:

a term mode specifying section to receive a user input that specifies any of the plurality of terms of the displayed mathematical expression;

a kind changing section to receive a user input that changes a kind of display mode of the specified one of the plurality of terms to another one of the plurality of kinds of display modes; and a type converting section to convert a type of the specified one of the plurality of terms into another type corresponding to said another one of the plurality of kinds of display modes, and to renew and display the mathematical expression.

13. The mathematical expression calculation apparatus according to claim 9, wherein the type-sorted display control section detects at least a term of decimal and a term of fraction included in the plurality of terms of the mathematical expression, and displays the detected term of decimal and the detected term of fraction in different kinds of display modes from each other.

* * * * *